United States Patent
Kang

(10) Patent No.: US 10,308,204 B2
(45) Date of Patent: Jun. 4, 2019

(54) KNEE AIR BAG APPARATUS AND METHOD FOR MANUFACTURING THE SAME

(71) Applicant: Hyundai Mobis Co., Ltd., Seoul (KR)

(72) Inventor: I Seul Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 190 days.

(21) Appl. No.: 15/233,019

(22) Filed: Aug. 10, 2016

(65) Prior Publication Data

US 2017/0066397 A1     Mar. 9, 2017

(30) Foreign Application Priority Data

Sep. 9, 2015   (KR) .......................... 10-2015-0127878

(51) Int. Cl.
*B60R 21/206* (2011.01)
*B60R 21/217* (2011.01)
*B60R 21/231* (2011.01)

(52) U.S. Cl.
CPC ........ *B60R 21/206* (2013.01); *B60R 21/2171* (2013.01); *B60R 2021/23169* (2013.01)

(58) Field of Classification Search
CPC .............. B60R 21/206; B60R 21/2171; B60R 2021/23169
See application file for complete search history.

(56) References Cited

U.S. PATENT DOCUMENTS 5,536,041 A * 7/1996 Acker ................. B60R 21/2171
                                                      280/740
5,566,972 A * 10/1996 Yoshida .............. B60R 21/2171
                                                      280/728.2
7,090,243 B2    8/2006 Igawa
7,226,077 B2 *  6/2007 Abe ...................... B60R 21/206
                                                      280/728.1
7,306,257 B2 * 12/2007 Yoshikawa ........... B60R 21/207
                                                      280/728.2
7,597,351 B2 * 10/2009 Kashiwagi ............ B60R 21/207
                                                      280/730.2
7,611,195 B2   11/2009 Yoshikawa et al.
(Continued)

FOREIGN PATENT DOCUMENTS

CN             1448294        10/2003
CN            101037104         9/2007
(Continued)

OTHER PUBLICATIONS

The Second Office Action dated Jan. 9, 2019, issued in Chinese Patent Application No. 201610801598.3.
(Continued)

*Primary Examiner* — Paul N Dickson
*Assistant Examiner* — Timothy Wilhelm
(74) *Attorney, Agent, or Firm* — H.C. Park & Associates, PLC

(57) ABSTRACT

Exemplary embodiments provide a knee air bag apparatus, and a method of manufacturing a knee air bag apparatus, including an air bag to be inflated by gas introduced thereinto, an air bag housing accommodating the air bag therein, and an inflator for generating the gas, the inflator having a first portion received in the air bag, and a remaining portion disposed outside the air bag within the air bag housing for connection of signal wiring.

6 Claims, 6 Drawing Sheets

(56) References Cited

U.S. PATENT DOCUMENTS

| | | | |
|---|---|---|---|
| 7,658,400 B2 * | 2/2010 | Wipasuramonton | B60R 21/2171 280/728.2 |
| 7,841,441 B2 | 11/2010 | Takimoto et al. | |
| 7,862,078 B2 * | 1/2011 | Yokota | B60R 21/2171 280/728.2 |
| 7,938,436 B2 * | 5/2011 | Lunt | B60R 21/2171 280/728.2 |
| 7,988,191 B2 * | 8/2011 | Weyrich | B60R 21/237 280/736 |
| 8,047,570 B2 * | 11/2011 | Feller | B60R 21/239 280/728.2 |
| 8,408,582 B2 * | 4/2013 | Lunt | B60R 21/217 280/728.2 |
| 8,998,248 B2 * | 4/2015 | Shankar | B60N 2/42718 280/728.2 |
| 9,061,652 B2 | 6/2015 | Acker et al. | |
| 9,180,833 B2 * | 11/2015 | Jo | B60R 21/2171 |
| 9,290,148 B2 * | 3/2016 | Hotta | B60R 21/2171 |
| 9,487,176 B2 * | 11/2016 | Loos | B60R 21/2171 |
| 2003/0193174 A1 | 10/2003 | Abe | |
| 2005/0052009 A1 | 3/2005 | Abe | |
| 2006/0108777 A1 * | 5/2006 | Mabuchi | B60R 21/2171 280/730.2 |
| 2007/0085305 A1 * | 4/2007 | Feller | B60R 21/231 280/728.2 |
| 2008/0084051 A1 * | 4/2008 | Okuhara | B60R 21/2171 280/728.2 |
| 2008/0238059 A1 * | 10/2008 | Astrom | B60R 21/2346 280/741 |
| 2009/0001699 A1 * | 1/2009 | Honold | B60R 21/2171 280/740 |
| 2010/0201106 A1 | 8/2010 | Lisseman et al. | |
| 2010/0207367 A1 | 8/2010 | Weyrich et al. | |
| 2010/0207368 A1 | 8/2010 | Weyrich | |
| 2011/0148077 A1 * | 6/2011 | Enders | B60R 21/205 280/728.2 |
| 2013/0229002 A1 * | 9/2013 | Enders | B60R 21/201 280/728.2 |

FOREIGN PATENT DOCUMENTS

| | | |
|---|---|---|
| CN | 101336178 | 12/2008 |
| CN | 101842269 | 9/2010 |
| CN | 102781734 | 11/2012 |
| CN | 103534148 | 1/2014 |
| DE | 60 2004 002 164 | 12/2006 |
| DE | 10 2010 001 736 | 9/2010 |
| WO | 2009/056598 | 5/2009 |

OTHER PUBLICATIONS

Office Action dated Feb. 12, 2019, issued in German Patent Application No. 102016114612.9.

* cited by examiner

KNEE AIR BAG APPARATUS AND METHOD FOR MANUFACTURING THE SAME

CROSS-REFERENCE TO RELATED APPLICATION

This application claims priority from and the benefit of Korean Patent Application No. 10-2015-0127878, filed on Sep. 9, 2015, which is hereby incorporated by reference for all purposes as if fully set forth herein.

BACKGROUND

Field

Exemplary embodiments relate to a knee air bag apparatus and a method for manufacturing the same, and more particularly to a knee air bag apparatus for protecting the knees of an occupant in a vehicle in the event of an accident and a method for manufacturing the same.

Discussion of the Background

Generally, a vehicle is equipped with an air bag apparatus, which receives gas in the event of an accident and, as such, inflates to protect an occupant in the vehicle.

Such an air bag apparatus is installed at desired areas of a vehicle. For example, there are a driver seat air bag apparatus mounted in a steering wheel to protect a driver seated in a driver seat, a passenger seat air bag apparatus mounted inside a portion of a front panel above a glove box to protect an occupant seated in a passenger seat, a curtain air bag apparatus mounted along a roof rail to protect a side of an occupant, a knee air bag apparatus mounted inside an instrument panel to protect the knees of an occupant, and so on.

The knee air bag apparatus includes an air bag housing installed inside the instrument panel to accommodate an inflator for generating gas and an air bag. In the event of a vehicle accident, the air bag receives gas generated from the inflator and, as such, is inflated and deployed to protect the knee of an occupant.

Typically, the inflator is installed within the air bag in order to allow the air bag to be inflated and deployed by gas generated by the inflator.

In order to install the inflator within the air bag, an inflator hole is perforated through the air bag such that the inflator is inserted into the air bag through the inflator hole. That is, the inflator is inserted into the air bag through the inflator hole such that the inflator is completely accommodated within the air bag.

A wire is connected to the inflator in order to send an electrical signal from a controller to the inflator in the event of a vehicle accident. When the inflator receives the electrical signal via the wire, a gas production medium contained in the inflator produces gas.

The wire connected to the inflator should be connected to the controller after passing through the inflator hole formed through the air bag. For this reason, the inflator hole is usually not sealed. As a result, gas generated from the inflator in the event of a vehicle accident may be discharged outwards from the air bag through the inflator hole and, as such, the deployment pressure of the air bag may not be optimal. For this reason, there may be a problem in that the air bag cannot protect the knees of the occupant due to the lower pressure.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a knee air bag apparatus capable of securing a desired deployment pressure of an air bag thereof through prevention of leakage of gas from the air bag, and a method for manufacturing the same.

Additional aspects will be set forth in the detailed description which follows, and, in part, will be apparent from the disclosure, or may be learned by practice of the inventive concept.

An exemplary embodiment provides a knee air bag apparatus including an air bag to be inflated by gas introduced thereinto, an air bag housing accommodating the air bag therein, and an inflator for generating the gas, the inflator having a portion received in the air bag, and a remaining portion disposed outside the air bag within the air bag housing.

An exemplary embodiment also provides a method for manufacturing a knee air bag apparatus, including inserting a portion of an inflator to generate gas into an air bag through a first slit formed at the air bag, sealing the first slit at an outside of the air bag by a seal member, and coupling the seal member to the air bag, and inserting the inflator and the air bag into an air bag housing to accommodate the air bag, and coupling the inflator to the air bag housing.

Detailed matters of other embodiments may be apparent from the following description and the accompanying drawings.

Various effects are provided by the knee air bag apparatus and the method for manufacturing the same according to the embodiments of the present disclosure. That is, only a portion of the inflator is inserted into the air bag, and the remaining portion of the inflator is disposed outside the air bag within the air bag housing. Accordingly, the wire which sends an electrical signal to the inflator in order to cause the inflator to generate gas may be connected to the inflator disposed outside the air bag, and the first slit that allows insertion of a portion of the inflator into the air bag may be sealed. Thus, it may be possible to prevent gas generated from the inflator from leaking from the air bag and, as such, a desired deployment pressure of the air bag may be secured.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
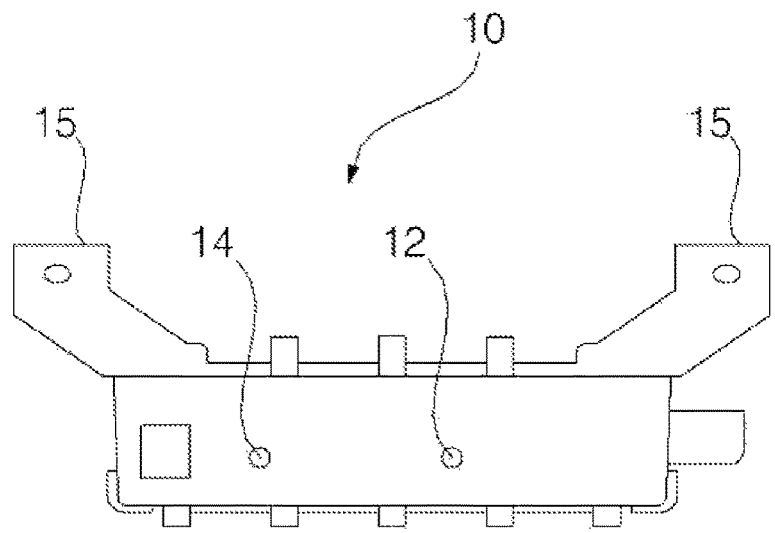
FIGS. 1A, 1B, 1C, 1D, and 1E are exploded perspective views illustrating a knee air bag apparatus according to an exemplary embodiment.
Figure 1B:
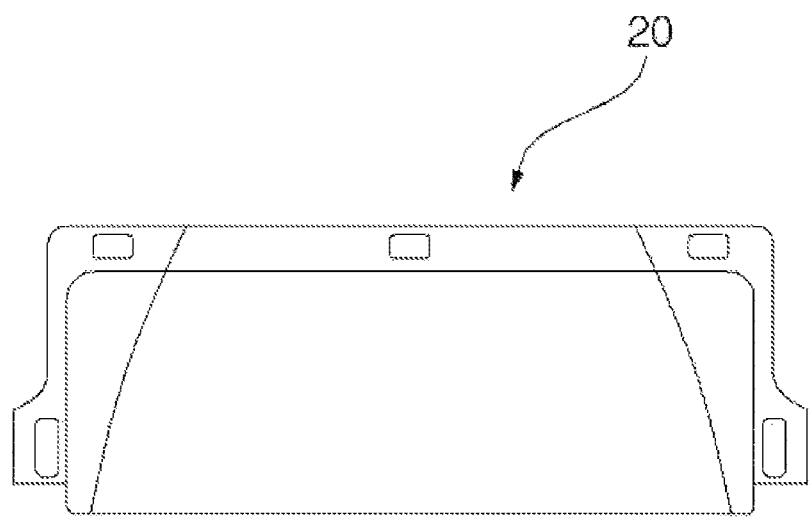
Figure 1C:
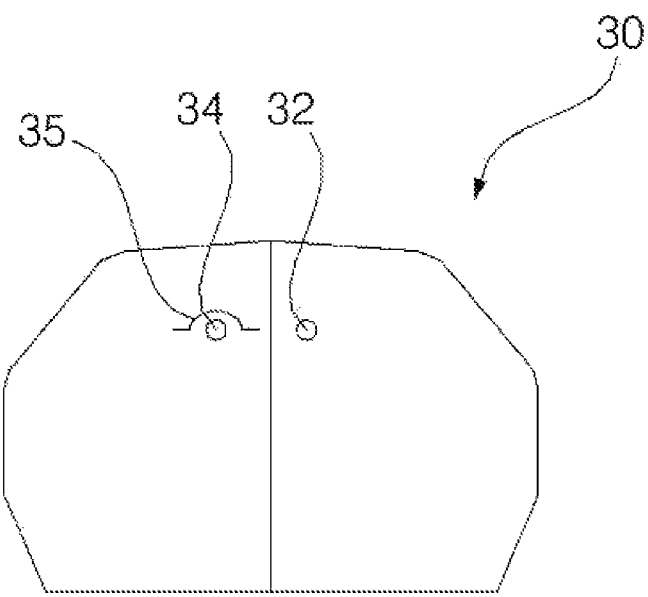
Figure 1D:
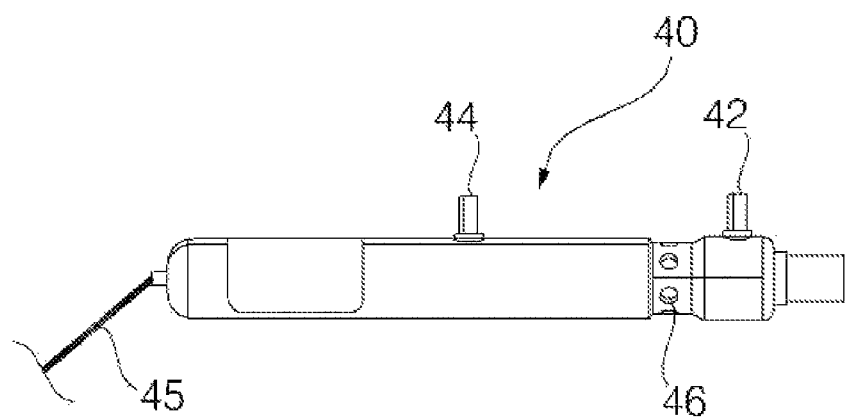
Figure 1E:
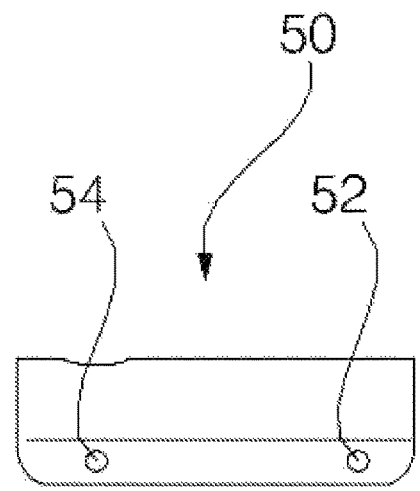

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of films, panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a knee air bag apparatus and a method for manufacturing the same according to an embodiment of the present disclosure will be described with reference to the accompanying drawings.

Figure 2:
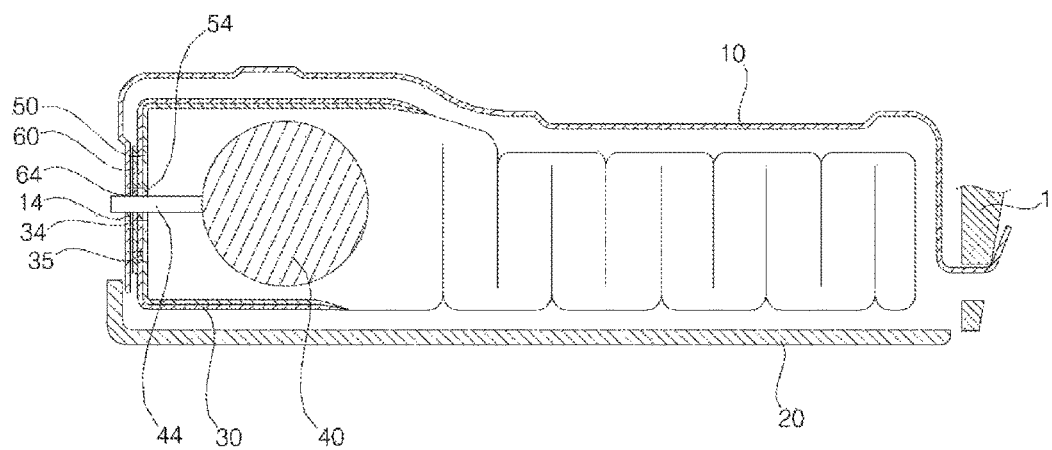
FIG. 2 is a sectional view illustrating the knee air bag apparatus according to an exemplary embodiment.
Figure 3:
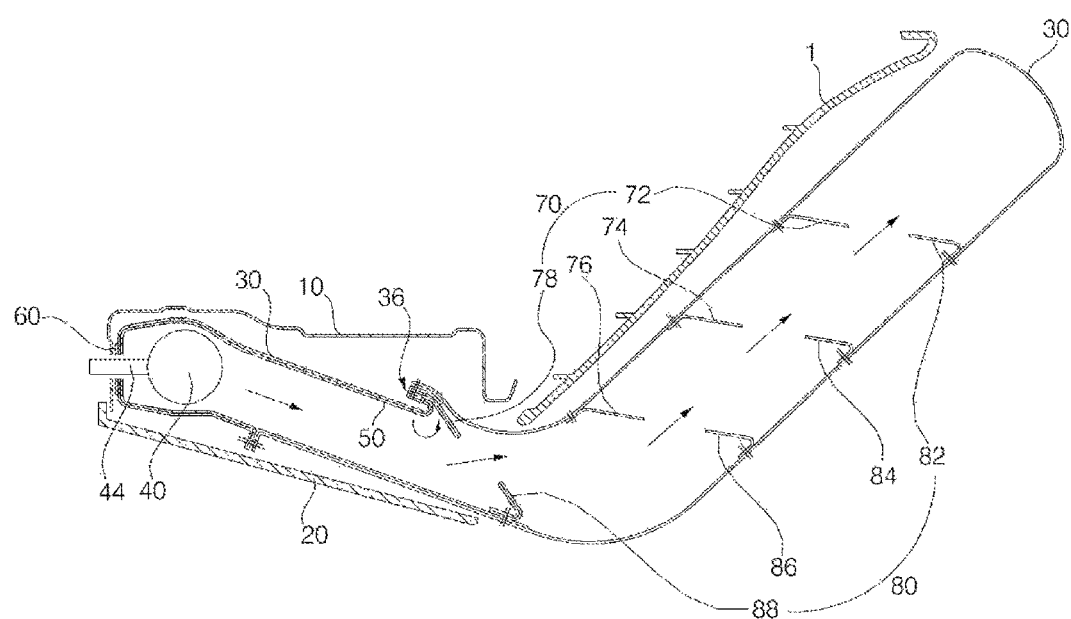
FIG. 3 is a view illustrating operation of the knee air bag apparatus illustrated in FIG. 2.

FIGS. 1A, 1B, 1C, 1D, and 1E are exploded perspective views illustrating a knee air bag apparatus according to an exemplary embodiment. FIG. 2 is a sectional view illustrating the knee air bag apparatus according to an exemplary embodiment. FIG. 3 is a view illustrating operation of the knee air bag apparatus illustrated in FIG. 2.

Referring to FIGS. 1A, 1B, 1C, 1D, 1E, 2, and 3, the knee air bag apparatus according to an exemplary embodiment includes an air bag housing 10, an air bag door 20, an air bag 30, an inflator 40, and a protector 50.

The air bag housing 10 contains the air bag 30, together with the air bag door 20. That is, the air bag 30 may be disposed in a folded state in an inner space defined by the air bag housing 10 and air bag door 20.

The air bag housing 10 is provided at a top thereof with two mounting brackets 15 to be mounted to a vehicle body. The two mounting brackets 15 are laterally spaced apart from each other. The mounting brackets 15 may be fastened to the vehicle body by bolts or similar fasteners. When the mounting brackets 15 are fastened to the vehicle body, the air bag housing 10 may be arranged beneath an instrument panel 1 disposed within a vehicle.

The air bag door 20 may be disposed at a bottom of the air bag housing 10 such that a rear end of the air bag door 20 is pivotally coupled to a rear end of the air bag housing 10. When the air bag 30 is inflated by gas generated from the inflator 40, the air bag door 20 may pivot about the rear end thereof coupled to the air bag housing 10 by an inflation force of the air bag 30. As a result, a front end of the air bag door 20 is spaced away from the air bag housing 10. Accordingly, the air bag 30 emerges from the air bag housing 10 through a gap formed between the air bag housing 10 and the air bag door 20 and, as such, is deployed into the vehicle.

The air bag 30 is made of a flexible material expandable by gas generated from the inflator 40. The air bag 30 inflates by gas generated from the inflator 40, and emerges from the air bag housing 10 through a gap between the air bag housing 10 and the air bag door 20 such that the air bag 30 is deployed upwards from beneath the instrument panel 1. In this manner, the air bag may be interposed between the instrument panel 1 and the occupant.

The air bag 30 may be coupled, at a rear end thereof, to a rear wall of the air bag housing 10.

A wire 45 is connected to the inflator 40. The wire 45 may be connected to a rear end of the inflator 40 by a connector. The wire 45 sends an electrical signal to the inflator 40. The electrical signal may be generated from a controller, such as an electronic control unit (ECU), in the event of a vehicle accident. When the electrical signal is sent to the inflator 40 via the wire 45, the gas production medium contained in the inflator 40 produces gas.

Although a detailed configuration of the inflator 40 will be described with reference to FIGS. 4, 5, and 6, only a portion of the inflator 40 is disposed in the air bag 30, and the remaining portion of the inflator 40 is disposed outside the air bag 30 within the air bag housing 10. That is, a gas discharge portion of the inflator 40 is received in the air bag 30, whereas a portion of the inflator 40 connected to the wire 45 is disposed outside the air bag 30 within the air bag housing 10 and, as such, it may be possible to prevent gas discharged into the air bag 30 from leaking from the air bag 30.

A first slit 35 is formed at the rear end of the air bag 30 for reception of a desired portion of the inflator 40 in the air bag 30 and to allow insertion of a portion of the inflator 40 into the air bag 30. In addition, a seal member 60 is coupled to the rear end of the air bag 30, to seal the first slit 35 after a portion of the inflator 40 has been inserted into the air bag 30 through the first slit 35. The seal member 60 is coupled to an outer surface of the air bag 30 and is disposed within the air bag housing 10. The seal member 60 may be made of the same flexible material as the air bag 30, and may be coupled to the air bag 30.

The protector 50 may be coupled to a rear surface of the air bag 30 within the air bag 30. The protector 50 is a shield member for preventing the air bag 30 from being damaged due to heat of gas generated from the inflator 40. The protector 50 may be made of the same flexible material as the air bag 30, and may be coupled to the air bag 30.

The protector 50 is formed with a first through hole 52 and a second through hole 54. A third through hole 32 and a fourth through hole 34 are formed through the rear end of the air bag 30. A fifth through hole 64 is formed through the seal member 60. In addition, a first fastening hole 12 and a second fastening hole 14 are formed through the rear wall of the air bag housing 10. The first through hole 52, third through hole 32, and first fastening hole 12 are arranged at corresponding positions, respectively. The second through hole 54, fourth through hole 34, fifth through hole 64 and second fastening hole 14 are arranged at corresponding positions, respectively.

A first stud 42 and a second stud 44 protrude from an outer peripheral surface of the inflator 40 received in the air bag 30. The first stud 42 and second stud 44 are spaced apart from each other in a lateral direction, namely, in a longitudinal direction of the inflator 40. The first stud 42 is arranged near a front end of the inflator 40. The second stud 44 is arranged substantially at a middle portion of the inflator 40 spaced apart from the rear end of the inflator 40 by 89 mm.

A gas outlet 46 is formed at the inflator 40 between the first stud 42 and the second stud 44, to discharge gas. The gas outlet 46 is arranged near the first stud 42. In an embodiment, a plurality of gas outlets 46 may be formed to be spaced apart from one another along the periphery of the inflator 40.

When the inflator 40 is inserted into the air bag 30, the first stud 42 extends through the protector 50 and air bag 30, and is then fastened to the rear wall of the air bag housing 10. That is, when the inflator 40 is inserted into the air bag 30, a free end of the first stud 42 protrudes outwards from the air bag 30 after extending through the first through hole 52 and third through hole 32. The protruding end of the first stud 42 is then inserted into the first fastening hole 12 and, as such, is fastened to the air bag housing 10.

When the inflator 40 is partially inserted into the air bag 30, the second stud 44 extends through the protector 50, air bag 30 and seal member 60, and is then fastened to the rear wall of the air bag housing 10. When the inflator 40 has been partially inserted into the air bag 30, a free end of the second stud 44 protrudes outwards from the air bag 30 after extending through the second through hole 54, fourth through hole 34 and fifth through hole 64. The protruding end of the second stud 44 is then inserted into the second fastening hole 14 and, as such, is fastened to the air bag housing 10.

The air bag housing 10 may be disposed beneath the instrument panel 1 at a lower height than the knees of the occupant. Accordingly, the air bag 30 may deploy upwards in order to protect the knees of the occupant. To this end, the air bag 30 may be formed with a folded portion 36 formed by folding the air bag 30 such that the air bag 30 has a shorter length at an upper portion thereof than at a lower portion thereof. The folded portion 36 makes it possible to apply a higher tensile force to the upper portion of the air bag 30 than to the lower portion of the air bag 30 such that the air bag 30 is deployed while being bent upwards through pivoting about the folded portion 36. In the deployed state, the air bag 30 may be interposed between the instrument panel 1 and the knees of the occupant.

An upper tether 70 may be coupled to an inner surface of the upper portion of the air bag 30. A lower tether 80 may be coupled to an inner surface of the lower portion of the air bag 30.

The upper tether 70 and the lower tether 80 are spaced apart from each other, to define a gas passage for guiding the passage of gas therebetween.

Gas introduced into the air bag 30 from the inflator 40 passes through the gas passage while striking the upper tether 70 and lower tether 80. In this case, deployment force of the air bag 30 is enhanced by force of the gas striking the upper tether 70 and lower tether 80.

In the illustrated embodiment, a plurality of upper tethers 70 and a plurality of lower tethers 80 are employed.

That is, the upper tethers 70 include a first upper tether 72, a second upper tether 74 and a third upper tether 76, which are arranged at a portion of the air bag 30 to be disposed outside the instrument panel 1 in a deployed state while being spaced apart from one another, and a fourth tether 78, which is disposed at a portion of the air bag 30 to remain within an inner space defined between the air bag housing 10 and the air bag door 20 without being deployed outside the instrument panel 1.

In addition, the lower tethers 80 include a first lower tether 82 spaced apart from the first upper tether 72, to define the gas passage between the first upper tether 72 and the first lower tether 82, a second lower tether 84 spaced apart from the second upper tether 74, to define the gas passage between the second upper tether 74 and the second lower tether 84, a third lower tether 86 spaced apart from the third upper tether 76, to define the gas passage between the third upper tether 76 and the third lower tether 86, and a fourth lower tether 88 spaced apart from the fourth upper tether 78, to define the gas passage between the fourth upper tether 78 and the fourth lower tether 88.

Each of the first upper tether 72, second upper tether 74 and third upper tether 76 may be formed to have a single fold, whereas the fourth upper tether 78 may be formed to have a double fold. Similarly, each of the first lower tether 82, second lower tether 84 and third lower tether 86 may be formed to have a single fold, whereas the fourth lower tether 88 may be formed to have a double fold.

In the illustrated embodiment, the folded portion 36 is formed by folding the air bag 30, and is coupled to the fourth upper tether 78.

In the illustrated embodiment, four upper tethers 70 are arranged, and the folded portion 36 is coupled to the fourth upper tether 78. However, any number of upper tethers 70 may be used, as long as one upper tether, which is disposed at a portion of the air bag 30 to remain within the inner space defined between the air bag housing 10 and the air bag door 20 without being deployed outside the instrument panel 1 (in the illustrated case, the fourth upper tether 78), is coupled to the folded portion 36. That is, the folded portion 36 is formed at a position where the upper tether remaining within the inner space defined between the air bag housing 10 and the air bag door 20 is disposed and, as such, the air bag 30 may be deployed upwards outside the instrument panel 1 while pivoting upwards about the folded portion 36 as a hinge point.

Hereinafter, a method for manufacturing the knee air bag apparatus having the above-described configuration according to an exemplary embodiment.

Figure 4:
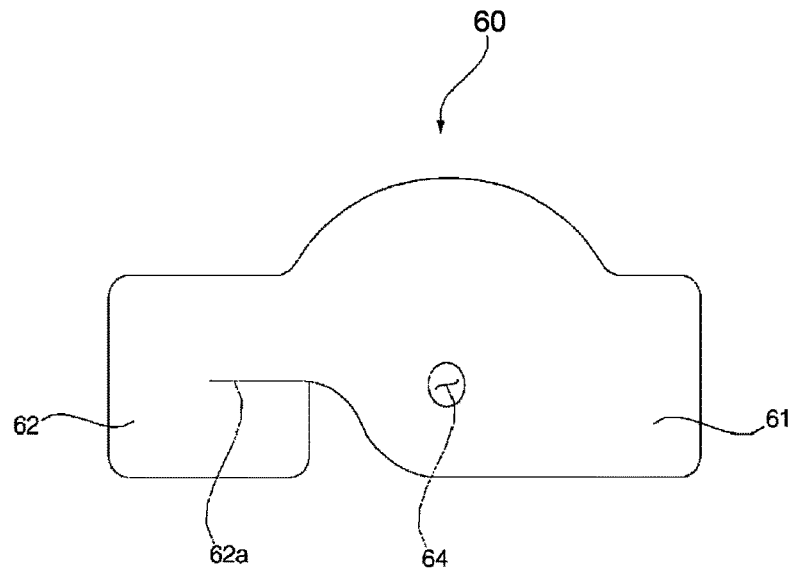
FIG. 4 is a view illustrating a seal member, which is coupled to an air bag of the knee air bag apparatus, according to an exemplary embodiment.

FIG. 4 is a view illustrating the seal member, which is coupled to the air bag of the knee air bag apparatus according to an exemplary embodiment. FIGS. 5 and 6 are views illustrating a procedure for coupling the inflator to the air bag of the knee air bag apparatus according to an exemplary embodiment.

Referring to FIG. 4, the seal member 60 includes a seal portion 61 and an extension portion 62. The seal portion 61 seals the first slit 35 when a portion of the inflator 40 has been inserted into the air bag 30 through the first slit 35. The above-described fifth through hole 64 is formed at the seal portion 61.

The extension portion 62 extends from the seal portion 61. The extension portion 62 encloses at least a portion of the outer peripheral surface of the inflator 40 disposed outside the air bag 30, together with the seal portion 61.

A second slit 62a open at one side thereof is formed at the extension portion 62, to allow the extension portion 62 to enclose at least a portion of the peripheral surface of the inflator 40 disposed outside the air bag 30, together with the seal portion 61.

When the seal member 60 is coupled to the air bag 30, the second slit 62a extends along a line passing the third through hole 32 and fourth through hole 34 formed at the air bag 30. The second slit 62a is open at a side thereof facing the third through hole 32 and fourth through hole 34.

Figure 5:
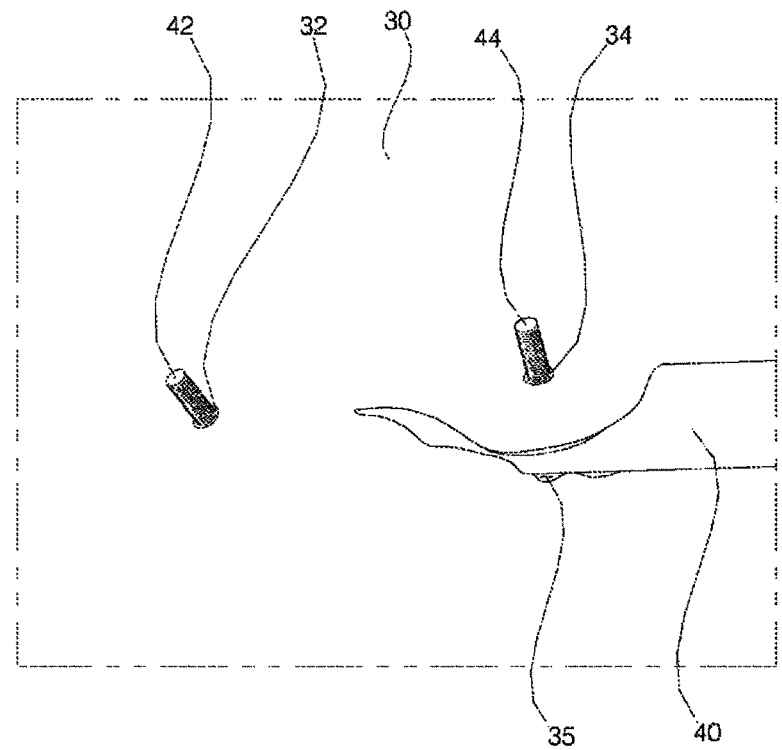
FIGS. 5 and 6 are views illustrating a procedure for coupling an inflator to the air bag of the knee air bag apparatus according to an exemplary embodiment.

Referring to FIG. 5, the first slit 35 is formed at the air bag 30, as described above. The first slit 35 is arranged adjacent to the fourth through hole 34. That is, the air bag 30 may be lifted at a portion thereof formed with the fourth through hole 34 by the operator, by virtue of the first slit 35. A gas discharge portion of the inflator 40 is inserted into the air bag 30 after lifting the portion of the air bag 30 formed with the fourth through hole 34. At this time, the first stud 42 and second stud 44 are also inserted into the inflator 40.

The first stud 42 protrudes outwards from the air bag 30 after extending through the first through hole 52 formed at the protector 50 and the third through hole 32 formed at the air bag 30. The second stud 44 protrudes outwards from the air bag 30 after extending through the second through hole 54 formed at the protector 50 and the fourth through hole 34 formed at the air bag 30.

Figure 6:
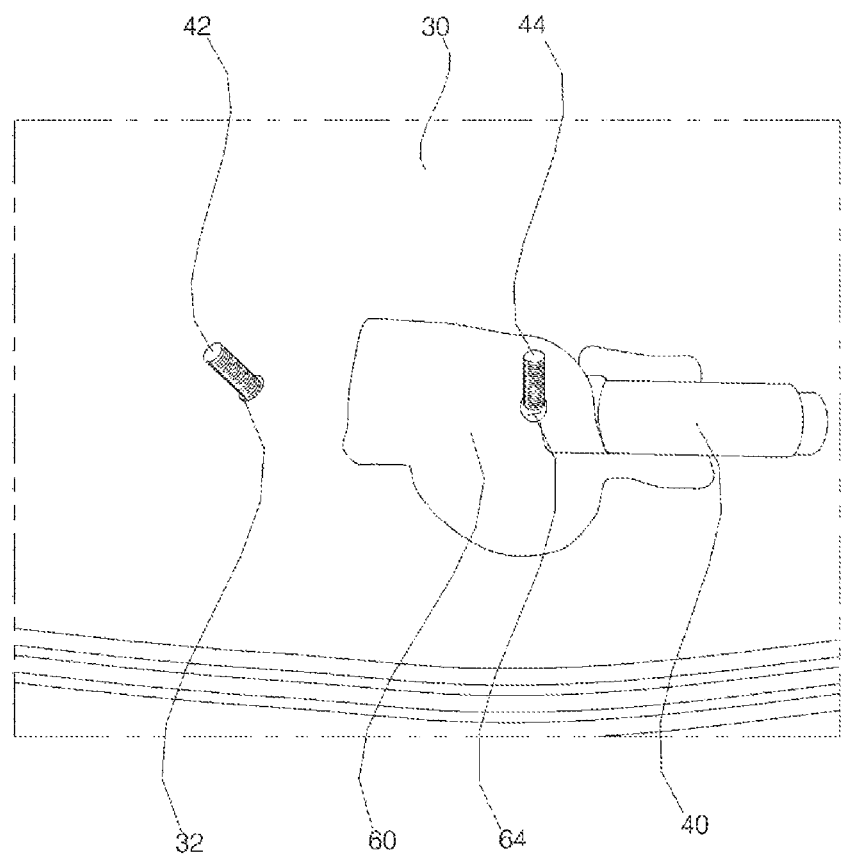

Referring to FIG. 6, the first slit 35 is then sealed at the outside of the air bag 30 by the seal member 60. The seal member 60 is then coupled to the air bag 30. The second stud 44 extending through the second through hole 54 and fourth through hole 34 is then inserted into the fifth through hole 64 formed at the seal member 60. Thereafter, the seal member 60 is coupled to the air bag 30 when the seal member 60 is brought face to face with the outer surface of the air bag 30 and, as such, the first slit 35 is sealed. When the seal member 60 is coupled to the air bag 30, as described above, a free end of the second stud 44 protrudes outwards from the seal member 60 after extending through the seal member 60.

Subsequently, the first stud 42 is inserted into the first fastening hole 12 within the air bag housing 10 and, as such, is fastened to the air bag housing 10. In addition, the second stud 44 is inserted into the second fastening hole 14 within the air bag housing 10 and, as such, is fastened to the air bag housing 10. Thus, the air bag 30, protector 50, seal member 60 and inflator 40 are coupled to the air bag housing 10.

Thereafter, a front portion of the air bag 30 is folded several times, and is then inserted into the inner space defined between the air bag housing 10 and the air bag door 20 and, as such, an air bag module is completed.

As apparent from the above description, in the knee air bag apparatus manufactured in accordance with the above-described method while having the above-described configuration, only a portion of the inflator 40 is inserted into the air bag 30, and the remaining portion of the inflator 40 is disposed outside the air bag 30 within the air bag housing 10. Accordingly, the wire 45, which sends an electrical signal to the inflator 40 in order to cause the inflator 40 to generate gas, may be connected to the inflator 40 disposed outside the air bag 30, and the first slit 35, which allows insertion of a portion of the inflator 40 into the air bag 30, may be sealed. Thus, it may be possible to prevent gas generated from the inflator 40 from leaking from the air bag 30 and, as such, a desired deployment pressure of the air bag 30 may be secured.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A knee air bag apparatus, comprising:
an air bag;
an air bag housing accommodating the air bag therein; and
an inflator for generating gas, the inflator comprising a first portion received in the air bag, and a remaining portion disposed outside the air bag within the air bag housing;

wherein the inflator comprises at least one stud protruding from an outer peripheral surface of the inflator at a portion of the inflator received in the air bag and extending through the air bag such that the at least one stud is coupled to the air bag housing;

the at least one stud comprises a first stud and a second stud;

the first stud is coupled to the air bag housing after extending through the air bag; and the second stud is coupled to the air bag housing after extending through the air bag and a seal member;

the air bag comprises a third through hole through which the first stud extends and a fourth through hole through which the second stud extends;

wherein the seal member comprises an extension portion extending from a seal portion, the extension portion enclosing at least a portion of the outer peripheral surface of the inflator disposed outside the air bag together with the seal portion;

the extension portion comprises a second slit open at one side thereof, to enclose at least the portion of the outer peripheral surface of the inflator disposed outside the air bag;

the second slit extends along a line passing the third and fourth through holes, and the open side of the second slit faces the third and fourth through holes.

2. The knee air bag apparatus according to claim 1, wherein:

the air bag comprises a first slit through which the first portion of the inflator is inserted into the air bag; and the knee air bag apparatus further comprises the seal member coupled to the air bag, the seal member sealing the first slit at an outside of the air bag when the first portion of the inflator has been inserted into the air bag through the first slit.

3. The knee air bag apparatus according to claim 2, further comprising:

a protector disposed within the air bag;

the first stud is coupled to the air bag housing after extending through the protector and the air bag; and the second stud is coupled to the air bag housing after extending through the protector, the air bag and the seal member.

4. The knee air bag apparatus according to claim 3, wherein:

the protector comprises a first through hole through which the first stud extends and a second through hole through which the second stud extends;

the seal member comprises a fifth through hole through which the second stud extends; and the air bag housing comprises a first fastening hole into which the first stud is inserted after extending through the first through hole and the third through hole to be fastened to the air bag housing, and a second fastening hole into which the second stud is inserted after extending the fourth through hole and the fifth through hole to be fastened to the air bag housing.

5. The knee air bag apparatus according to claim 4, wherein the seal member comprises:

the seal portion for sealing the first slit when the first portion of the inflator has been inserted into the air bag through the first slit, the seal portion being formed with the fifth through hole.

6. The knee air bag apparatus according to claim 1, further comprising:

a wire for sending an electrical signal to the inflator to cause the inflator to generate gas; wherein the wire is coupled to the remaining portion of the inflator disposed outside the air bag.

* * * * *